United States Patent
Wakabayashi

(10) Patent No.: US 9,905,358 B2
(45) Date of Patent: Feb. 27, 2018

(54) CONTACTLESS POWER FEEDING APPARATUS AND CONTACTLESS POWER FEEDING SYSTEM

(71) Applicant: Funai Electric Co., Ltd, Daito-shi, Osaka (JP)

(72) Inventor: Naoyuki Wakabayashi, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 566 days.

(21) Appl. No.: 14/526,605

(22) Filed: Oct. 29, 2014

(65) Prior Publication Data

US 2015/0115731 A1  Apr. 30, 2015

(30) Foreign Application Priority Data

Oct. 31, 2013  (JP) .................. 2013-226940

(51) Int. Cl.
*H01F 38/14* (2006.01)
*H02J 5/00* (2016.01)
*H02J 50/12* (2016.01)
*H02J 50/40* (2016.01)
*H02J 50/70* (2016.01)
(Continued)

(52) U.S. Cl.
CPC ............ *H01F 38/14* (2013.01); *B60L 11/182* (2013.01); *B60L 11/1824* (2013.01); *B60L 11/1829* (2013.01); *B60L 11/1833* (2013.01); *B60L 11/1846* (2013.01); *H02J 5/005* (2013.01); *H02J 7/025* (2013.01); *H02J 50/12* (2016.02); *H02J 50/40* (2016.02); *H02J 50/70* (2016.02); *H02J 2007/0096* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ....................................................... H01F 38/14
USPC ............................................................ 307/104
See application file for complete search history.

(56) References Cited

U.S. PATENT DOCUMENTS

2012/0217819 A1  8/2012  Yamakawa et al.
2013/0020862 A1  1/2013  Miller
(Continued)

FOREIGN PATENT DOCUMENTS

JP  2002-272134 A  9/2002
JP  2013-110784 A  6/2013
(Continued)

OTHER PUBLICATIONS

Takahiro Tohi et al., "Maximum Efficiency of Contactless Power Transfer Systems using k and Q", The papers of Joint Technical Meeting on Motor Drive, IEE Japan, Dec. 2011, No. 37-45, including partial English translation (seven (7) pages).

*Primary Examiner* — Joseph Chang
(74) *Attorney, Agent, or Firm* — Crowell & Moring LLP

(57) ABSTRACT

A contactless power feeding apparatus includes a power source portion, a power feeding coil, and a power feeding apparatus side control portion, and the power feeding apparatus side control portion is configured to perform feeding voltage control in order to control the feeding voltage value of the power source portion on the basis of a coupling coefficient such that power transmission efficiency to a power receiving apparatus including a power receiving coil is in the vicinity of a maximum.

19 Claims, 13 Drawing Sheets

(51) Int. Cl.
*H02J 7/02* (2016.01)
*B60L 11/18* (2006.01)
*H02J 7/00* (2006.01)

(56) References Cited

U.S. PATENT DOCUMENTS

| | | |
|---|---|---|
| 2013/0026847 A1 | 1/2013 | Kim et al. |
| 2013/0058379 A1 | 3/2013 | Kim et al. |
| 2013/0134791 A1* | 5/2013 | Park .................. H01F 38/14 307/104 |
| 2013/0200719 A1 | 8/2013 | Ishihara et al. |
| 2014/0084701 A1 | 3/2014 | Bae |
| 2015/0130271 A1 | 5/2015 | Suzuki et al. |
| 2015/0130272 A1 | 5/2015 | Suzuki et al. |
| 2015/0130294 A1 | 5/2015 | Suzuki et al. |
| 2015/0326028 A1 | 11/2015 | Suzuki et al. |

FOREIGN PATENT DOCUMENTS

| | | |
|---|---|---|
| JP | 2013-162709 A | 8/2013 |
| JP | 2014-68529 A | 4/2014 |
| WO | WO 2013/042224 A1 | 3/2013 |

\* cited by examiner

CONTACTLESS POWER FEEDING APPARATUS AND CONTACTLESS POWER FEEDING SYSTEM

BACKGROUND OF THE INVENTION

Field of the Invention

The present invention relates to a contactless power feeding apparatus and a contactless power feeding system, and more particularly, it relates to a contactless power feeding apparatus and a contactless power feeding system each including a power feeding coil.

Description of the Background Art

A contactless power feeding apparatus and a contactless power feeding system each including a power feeding coil are known in general. Such a contactless power feeding apparatus is disclosed in Japanese Patent Laying-Open No. 2013-110784, for example.

The aforementioned Japanese Patent Laying-Open No. 2013-110784 discloses a contactless power feeding apparatus including a power feeding coil forming an electromagnetic coupled circuit with a power receiving coil provided in a power feed target (power receiving apparatus) and a resistance apparatus connected to the power feeding coil. This contactless power feeding apparatus is configured to control the resistance value of the resistance apparatus such that power feeding efficiency from the power feeding coil to the power receiving coil is maximized.

In the contactless power feeding apparatus described in the aforementioned Japanese Patent Laying-Open No. 2013-110784, however, a loss is generated in the resistance apparatus in the case where the resistance value is increased to maximize the power feeding efficiency, and hence power consumption for other than power feeding is disadvantageously increased.

SUMMARY OF THE INVENTION

The present invention has been proposed in order to solve the aforementioned problem, and an object of the present invention is to provide a contactless power feeding apparatus capable of suppressing an increase in power consumption for other than power feeding.

In order to attain the aforementioned object, a contactless power feeding apparatus according to a first aspect of the present invention includes a power source portion capable of changing a feeding voltage value, a power feeding coil generating a power feeding magnetic field by supply of an AC thereto from the power source portion, and a power feeding apparatus side control portion controlling the feeding voltage value of the power source portion. The power feeding apparatus side control portion is configured to perform feeding voltage control in order to control the feeding voltage value of the power source portion on the basis of a coupling coefficient between the power feeding coil and a power receiving coil provided outside, receiving electric power through the power feeding magnetic field of the power feeding coil such that power transmission efficiency to a power receiving apparatus including the power receiving coil is in the vicinity of a maximum.

In the contactless power feeding apparatus according to the first aspect of the present invention, as hereinabove described, the power feeding apparatus side control portion is configured to perform the feeding voltage control in order to control the feeding voltage value of the power source portion on the basis of the coupling coefficient between the power feeding coil and the power receiving coil provided outside, receiving electric power through the power feeding magnetic field of the power feeding coil such that the power transmission efficiency to the power receiving apparatus including the power receiving coil is in the vicinity of the maximum. Thus, the resistance value of the power feeding coil is not increased unlike the case where the power transmission efficiency is maximized by controlling the resistance value of the power feeding coil, and hence an increase in power consumption for other than power feeding can be suppressed. Furthermore, the feeding voltage value of the power source portion is controlled on the basis of the coupling coefficient including a distance between the power feeding coil and the power receiving coil as an element, whereby the feeding voltage value of the power source portion is controlled according to the distance between the power feeding coil and the power receiving coil such that the power transmission efficiency to the power receiving apparatus including the power receiving coil is in the vicinity of the maximum. Consequently, the power transmission efficiency can be increased regardless of the distance between the power feeding coil and the power receiving coil.

The aforementioned contactless power feeding apparatus according to the first aspect preferably further includes a communication portion communicating with the power receiving apparatus, and the power feeding apparatus side control portion is preferably configured to perform control of acquiring the inductance of the power receiving coil and a receiving AC voltage value that is a value of the AC voltage of the power receiving coil received through the power feeding magnetic field from the power receiving apparatus through the communication portion and calculating the coupling coefficient on the basis of the inductance and the receiving AC voltage value of the power receiving coil that are acquired, the inductance of the power feeding coil, and the feeding voltage value of the power source portion. According to this structure, the information about the power receiving coil can be acquired through the communication portion, and the coupling coefficient according to the type of the power receiving apparatus and the distance between the power feeding coil and the power receiving coil can be calculated on the basis of the acquired information. Consequently, the power feeding apparatus side control portion can properly perform the feeding voltage control according to the power receiving apparatus such that the power transmission efficiency is in the vicinity of the maximum.

In this case, the power feeding apparatus side control portion is preferably configured to acquire a receiving DC voltage value that is a value of a DC voltage obtained by rectifying the AC voltage of the power receiving coil and the load power value of the power receiving apparatus through the communication portion, and the power feeding apparatus side control portion is preferably configured to set a target receiving voltage value of the receiving DC voltage value in the case where the power transmission efficiency is in the vicinity of the maximum on the basis of the load power value of the power receiving apparatus that is acquired, the coupling coefficient, and the receiving AC voltage value and perform the feeding voltage control such that the receiving DC voltage value that is acquired becomes the target receiving voltage value that is set. According to this structure, feedback control can be performed such that the receiving DC voltage value becomes the target receiving voltage value, and hence the power feeding apparatus side control portion can more accurately perform the feeding voltage control such that the power transmission efficiency is in the vicinity of the maximum even when the load power value is changed.

In the aforementioned contactless power feeding apparatus performing the feeding voltage control such that the receiving DC voltage value becomes the set target receiving voltage value, the power feeding apparatus side control portion is preferably configured to perform control of calculating load resistance in the case where the power transmission efficiency is in the vicinity of the maximum on the basis of the coupling coefficient, the resistance value of the power receiving coil, the quality factor of the power receiving coil, and the quality factor of the power feeding coil and setting the target receiving voltage value corresponding to the load resistance. According to this structure, the load resistance is calculated according to the resistance value of the power receiving coil and the quality factor of the power receiving coil, and hence the target receiving voltage value can be set according to the characteristics of the power receiving coil to perform the feedback control.

In this case, the power feeding apparatus side control portion is preferably configured to perform control of setting the target receiving voltage value corresponding to the load resistance, using a value of a square root of a value obtained by multiplying the load power value of the power receiving apparatus by the load resistance. According to this structure, the target receiving voltage value corresponding to the load resistance can be easily set.

In the aforementioned contactless power feeding apparatus including the communication portion communicating with the power receiving apparatus, the power feeding apparatus side control portion is preferably configured to perform control of acquiring the receiving AC voltage value at a prescribed time interval. According to this structure, the coupling coefficient is calculated at the prescribed time interval on the basis of the acquired receiving AC voltage value, and hence even when the coupling coefficient is changed during power feeding, the power feeding apparatus side control portion can perform the feeding voltage control according to the change such that the power transmission efficiency is in the vicinity of the maximum.

In the aforementioned contactless power feeding apparatus according to the first aspect, the power feeding apparatus side control portion is preferably configured to perform control of calculating the coupling coefficient represented by k with the following formula (1), $k=(V2/V1) \cdot \sqrt{L1/L2} \ldots$ (1), setting the inductance of the power feeding coil to L1, the inductance of the power receiving coil to L2, the feeding voltage value of the power source portion to V1, and a receiving AC voltage value that is a value of the AC voltage of the power receiving coil to V2. According to this structure, the coupling coefficient represented by k can be easily calculated on the basis of the formula (1), and hence the power feeding apparatus side control portion can easily control the feeding voltage value of the power source portion such that the power transmission efficiency is in the vicinity of the maximum.

In this case, the formula (1) is preferably derived from the following formula (2), $M=k \cdot \sqrt{L1 \times L2} \ldots$ (2), used to calculate a mutual inductance M between the power feeding coil and the power receiving coil and the following formula (3), $$V2 = \frac{M}{L1} V1, \quad (3)$$

used to calculate the receiving AC voltage value represented by V2. According to this structure, the formula (1) can be derived on the basis of the formula (2) and the formula (3), and hence the coupling coefficient represented by k can be more easily calculated.

In the aforementioned contactless power feeding apparatus according to the first aspect, the power feeding apparatus side control portion is preferably configured not to feed electric power when the coupling coefficient is smaller than a prescribed value. According to this structure, no electric power is fed when the maximized power transmission efficiency is low, and hence wasted power consumption can be suppressed. Furthermore, power consumption for other than power feeding is suppressed, and hence heat generation in the apparatuses is suppressed. When the maximized power transmission efficiency is low denotes when the distance between the power feeding coil and the power receiving coil is significantly large or when extraneous material or the like blocking power feeding exists between the power feeding coil and the power receiving coil, for example.

The aforementioned contactless power feeding apparatus according to the first aspect preferably further includes a communication portion communicating with the power receiving apparatus, and the power feeding apparatus side control portion is preferably configured to perform control of acquiring model information about the power receiving apparatus through the communication portion and determining whether or not to start the feeding voltage control on the basis of the model information that is acquired. According to this structure, the power feeding apparatus side control portion can start the feeding voltage control only on the power receiving apparatus previously allowed to be fed with electric power.

In the aforementioned contactless power feeding apparatus according to the first aspect, the power source portion preferably includes a resonance capacitor, a voltage variable AC-DC converter, and a switching circuit generating the AC by turning on/off a DC voltage from the voltage variable AC-DC converter at the resonance frequency of the power feeding coil and the resonance capacitor. According to this structure, the electromagnetic field can be resonated between the power feeding coil and the power receiving coil, and the power feeding apparatus side control portion can perform the feeding voltage control while keeping a power factor high. Therefore, power consumption for other than power feeding can be reduced.

In this case, the resonance capacitor is preferably connected in series to the power feeding coil. According to this structure, the impedance of the resonance capacitor and the power feeding coil connected in series to each other is minimized when the resonance capacitor and the power feeding coil are driven at the resonance frequency. In the switching circuit, the impedance is small as compared with the case where a sine-wave generator and a variable amplifier are provided. Therefore, the impedance of the resonance capacitor and the power feeding coil connected in series to each other and the impedance of the switching circuit can be easily matched.

In the aforementioned contactless power feeding apparatus including the switching circuit, the switching circuit is preferably a half-bridge switching circuit including a gate drive circuit and two field effect transistors. According to this structure, the switching circuit can be easily configured as compared with the case where a full-bridge switching circuit is provided.

In the aforementioned contactless power feeding apparatus including the switching circuit, the switching circuit is preferably a full-bridge switching circuit including a gate drive circuit and four field effect transistors. According to this structure, the feeding voltage value capable of being applied to the power feeding coil can be doubled as compared with the case where the half-bridge switching circuit is provided. Consequently, the feeding voltage value can be doubled, so that a larger AC can be flowed into the power feeding coil. Thus, a large power feeding magnetic field can be generated.

In the aforementioned contactless power feeding apparatus according to the first aspect, the power source portion preferably includes a sine-wave generator and a variable amplifier. According to this structure, the sine-wave AC can be fed to the power feeding coil, and hence the high frequency of a feeding voltage can be suppressed unlike the case where the switching circuit is employed. Thus, electromagnetic interference of high-frequency noise to a peripheral device can be reduced.

A contactless power feeding system according to a second aspect of the present invention includes a power feeding apparatus including a power source portion capable of changing a feeding voltage value, a power feeding coil generating a power feeding magnetic field by supply of an AC thereto from the power source portion, and a power feeding apparatus side control portion controlling the feeding voltage value of the power source portion and a power receiving apparatus including a power receiving coil receiving electric power through the power feeding magnetic field. The power feeding apparatus side control portion is configured to perform feeding voltage control in order to control the feeding voltage value of the power source portion on the basis of a coupling coefficient between the power feeding coil and the power receiving coil such that power transmission efficiency from the power feeding apparatus to the power receiving apparatus is in the vicinity of a maximum.

In the contactless power feeding system according to the second aspect of the present invention, as hereinabove described, the power feeding apparatus side control portion is configured to control the feeding voltage value of the power source portion on the basis of the coupling coefficient between the power feeding coil and the power receiving coil such that the power transmission efficiency from the power feeding apparatus to the power receiving apparatus including the power receiving coil is in the vicinity of the maximum. Thus, the power transmission efficiency is increased by controlling the feeding voltage value of the power source portion unlike the case where the resistance value of the power feeding coil is controlled, and hence the resistance value is not increased in order to maximize the power transmission efficiency. Consequently, an increase in power consumption for other than power feeding can be suppressed. Furthermore, the feeding voltage value of the power source portion is controlled on the basis of the coupling coefficient including a distance between the power feeding coil and the power receiving coil as an element, and hence the power transmission efficiency can be increased regardless of the distance between the power feeding coil and the power receiving coil.

In the aforementioned contactless power feeding system according to the second aspect, the power feeding apparatus preferably includes a power feeding apparatus side communication portion communicating with the power receiving apparatus, the power receiving apparatus preferably includes a power receiving apparatus side communication portion communicating with the power feeding apparatus, and the power feeding apparatus side control portion is preferably configured to perform control of acquiring the inductance of the power receiving coil and a receiving AC voltage value that is a value of the AC voltage of the power receiving coil received through the power feeding magnetic field from the power receiving apparatus through the power feeding apparatus side communication portion and the power receiving apparatus side communication portion and calculating the coupling coefficient on the basis of the inductance and the receiving AC voltage value of the power receiving coil that are acquired, the inductance of the power feeding coil, and the feeding voltage value of the power source portion. According to this structure, the information about the power receiving coil can be acquired through the power feeding apparatus side communication portion and the power receiving apparatus side communication portion, and the coupling coefficient according to the type of the power receiving apparatus and the distance between the power feeding coil and the power receiving coil can be calculated on the basis of the acquired information. Consequently, the power feeding apparatus side control portion can properly perform the feeding voltage control according to the power receiving apparatus such that the power transmission efficiency is in the vicinity of the maximum.

In this case, the power feeding apparatus side control portion is preferably configured to acquire a receiving DC voltage value that is a value of a DC voltage obtained by rectifying the AC voltage of the power receiving coil and the load power value of the power receiving apparatus through the power feeding apparatus side communication portion and the power receiving apparatus side communication portion, and the power feeding apparatus side control portion is preferably configured to set a target receiving voltage value of the receiving DC voltage value in the case where the power transmission efficiency is in the vicinity of the maximum on the basis of the load power value of the power receiving apparatus that is acquired, the coupling coefficient, and the receiving AC voltage value and perform the feeding voltage control such that the receiving DC voltage value that is acquired becomes the target receiving voltage value that is set. According to this structure, feedback control can be performed such that the receiving DC voltage value becomes the target receiving voltage value, and hence the power feeding apparatus side control portion can more accurately perform the feeding voltage control such that the power transmission efficiency is in the vicinity of the maximum even when the load power value is changed.

In the aforementioned contactless power feeding system according to the second aspect, the power feeding apparatus side control portion is preferably configured to perform control of calculating the coupling coefficient represented by k with the aforementioned formula (1), setting the inductance of the power feeding coil to L1, the inductance of the power receiving coil to L2, the feeding voltage value of the power source portion to V1, and a receiving AC voltage value that is a value of the AC voltage of the power receiving coil to V2. According to this structure, the coupling coefficient represented by k can be easily calculated on the basis of the formula (1), and hence the power feeding apparatus side control portion can easily control the feeding voltage value of the power source portion such that the power transmission efficiency is in the vicinity of the maximum.

In the aforementioned contactless power feeding system according to the second aspect, the power feeding apparatus side control portion is preferably configured not to feed electric power when the coupling coefficient is smaller than a prescribed value. According to this structure, no electric power is fed when the maximized power transmission efficiency is low, and hence wasted power consumption can be suppressed. Furthermore, power consumption for other than power feeding is suppressed, and hence heat generation in the apparatuses is suppressed. When the maximized power transmission efficiency is low denotes when the distance between the power feeding coil and the power receiving coil is significantly large or when extraneous material or the like blocking power feeding exists between the power feeding coil and the power receiving coil, for example.

According to the present invention, as hereinabove described, the increase in power consumption for other than power feeding can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a contactless power feeding system 100 according to a first embodiment of the present invention is now described with reference to FIGS. 1 to 5.

Figure 1:
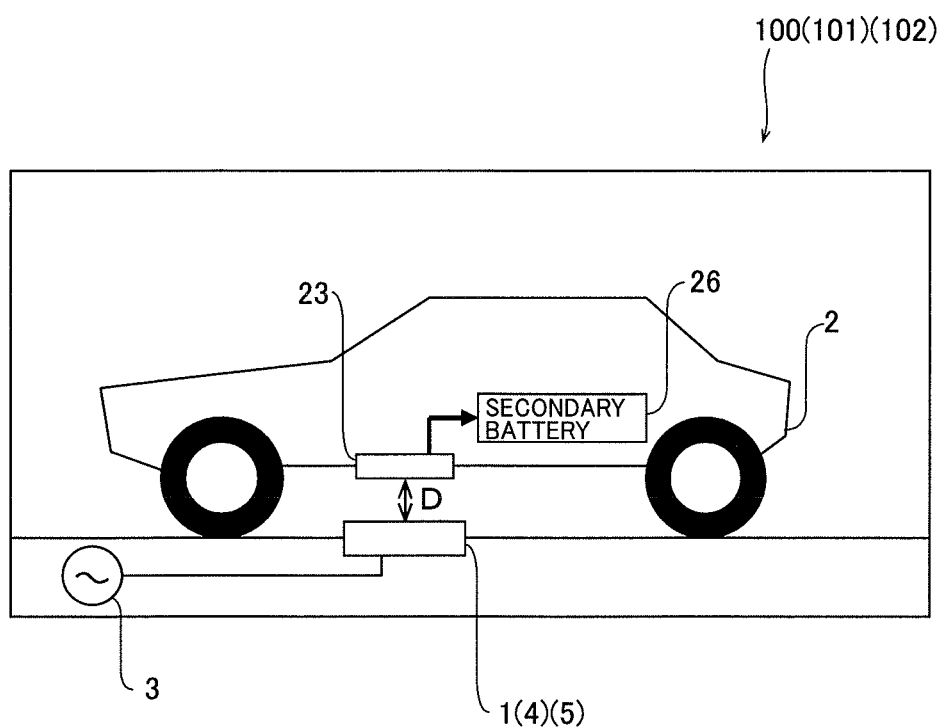
FIG. 1 is a diagram showing the overall structure of a contactless power feeding system according to a first embodiment of the present invention.
Figure 2:
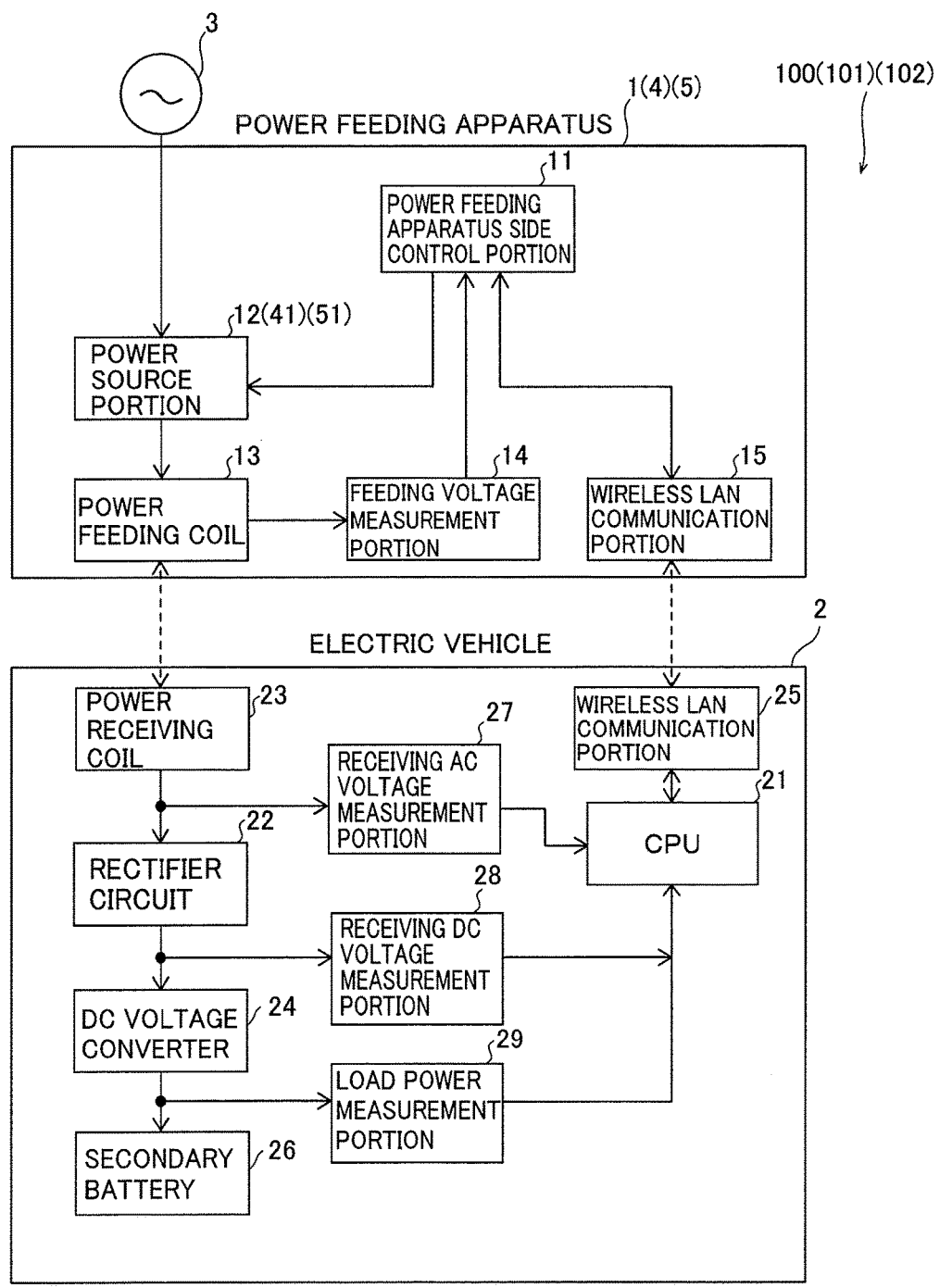
FIG. 2 is a block diagram showing the structure of the contactless power feeding system according to the first embodiment of the present invention.

The contactless power feeding system 100 according to the first embodiment includes a power feeding apparatus 1 placed on the ground, an electric vehicle 2 including a power receiving coil 23 and a rechargeable secondary battery 26, and an AC power source 3 supplying electric power to the power feeding apparatus 1, as shown in FIGS. 1 and 2. The electric vehicle 2 is brought to a stop near a position where the power feeding apparatus 1 is placed. The power feeding apparatus 1 is an example of the "contactless power feeding apparatus" in the present invention. The electric vehicle 2 is an example of the "power receiving apparatus" in the present invention. The secondary battery 26 is an example of the "load" in the present invention.

According to the first embodiment, the power feeding apparatus 1 includes a power source portion 12 capable of changing a feeding voltage value V1, a power feeding coil 13 generating a power feeding magnetic field by supply of an AC thereto from the power source portion 12, a power feeding apparatus side control portion 11 controlling the feeding voltage value V1 of the power source portion 12, a feeding voltage measurement portion 14 measuring the feeding voltage value V1 of the power source portion 12, and a wireless LAN (Local Area Network) communication portion 15 capable of communicating with the electric vehicle 2, as shown in FIG. 2. The wireless LAN communication portion 15 is an example of the "communication portion" or the "power feeding apparatus side communication portion" in the present invention.

Figure 3:
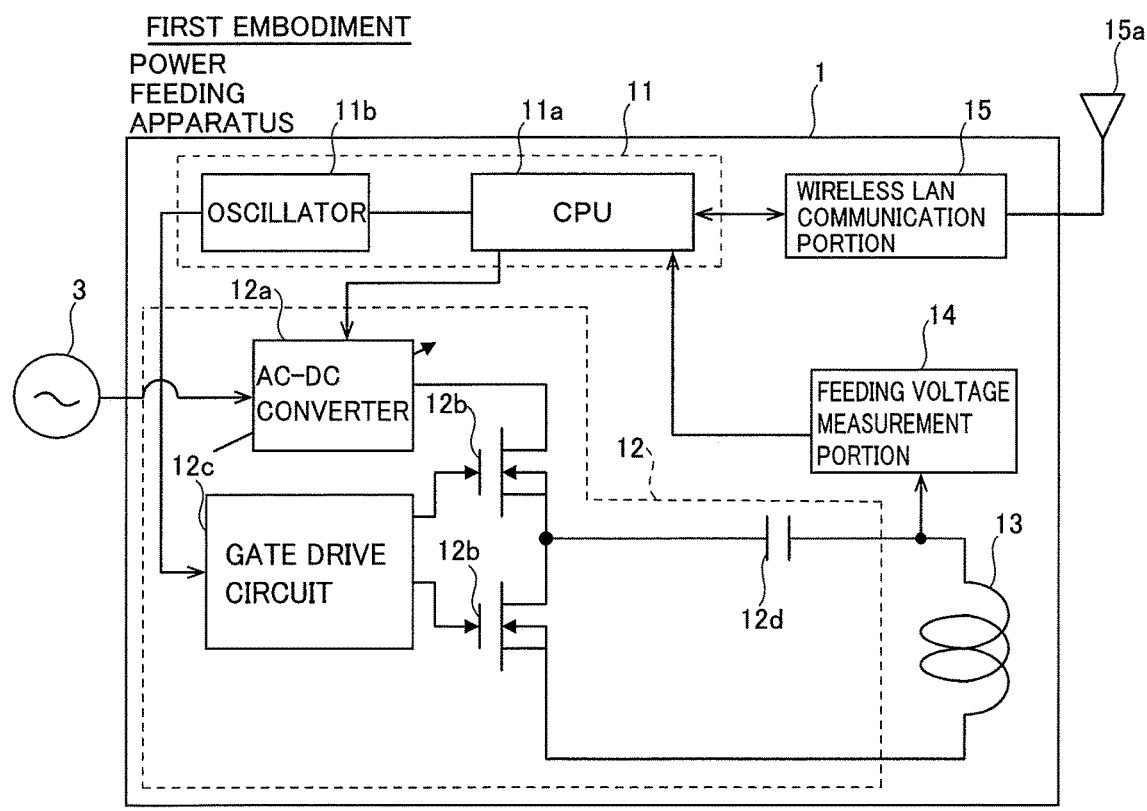
FIG. 3 is a block diagram showing the structure of a power feeding apparatus according to the first embodiment of the present invention.

As shown in FIG. 3, the power feeding apparatus side control portion 11 includes a CPU (Central Processing Unit) 11a and an oscillator 11b. The wireless LAN communication portion 15 includes an antenna 15a and is configured to be capable of communicating with the electric vehicle 2 through the antenna 15a.

According to the first embodiment, the power source portion 12 of the power feeding apparatus 1 includes a voltage variable AC-DC converter 12a electrically connected to the AC power source 3, FETs (Field Effect Transistors) 12b capable of turning on/off a DC voltage from the AC-DC converter 12a, and a gate drive circuit 12c capable of driving the FETs 12b by voltage application to the FETs 12b, as shown in FIG. 3. The power source portion 12 also includes a resonance capacitor 12d connected in series such that an AC generated by the voltage turned on/off by the FETs 12b flows thereinto. The CPU 11a is configured to control the gate drive circuit 12c to perform driving for turning on/off the FETs 12b at the resonance frequency of the power feeding coil 13 and the resonance capacitor 12d through the oscillator 11b. The FETs 12b and the gate drive circuit 12c are examples of the "switching circuit" in the present invention.

Figure 4:
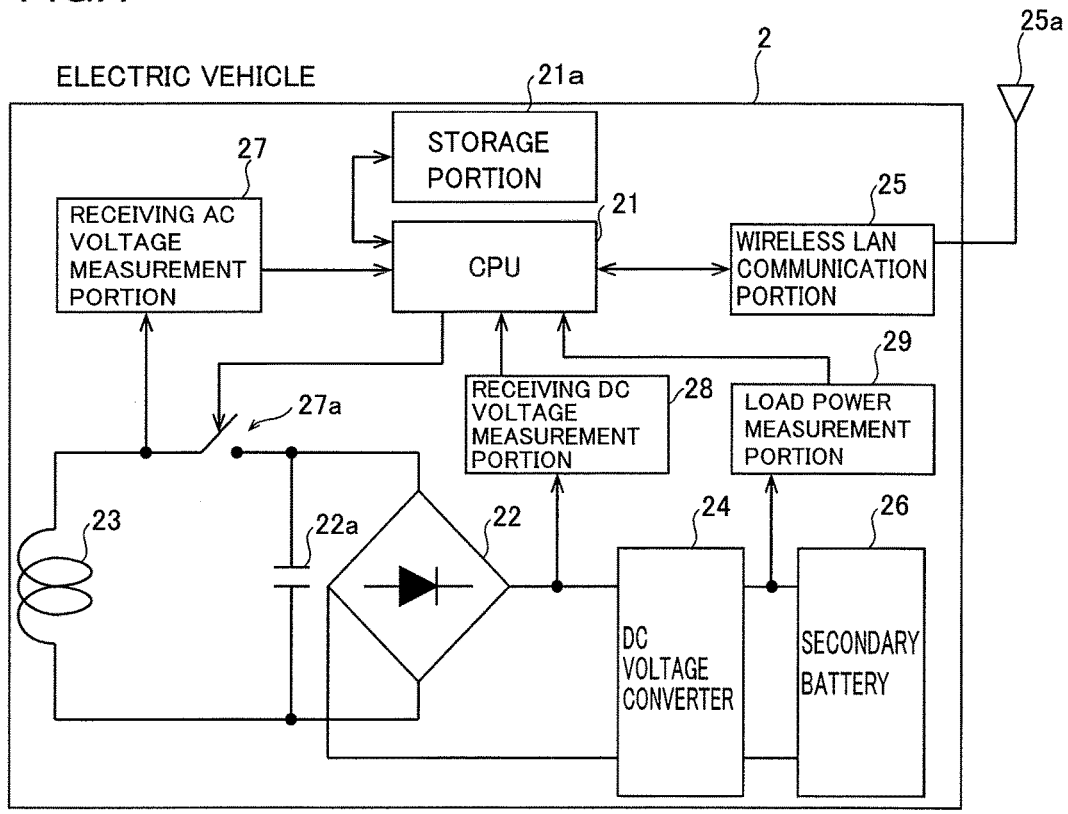
FIG. 4 is a block diagram showing the structure of an electric vehicle according to the first embodiment of the present invention.

As shown in FIG. 4, the electric vehicle 2 is provided with the a CPU 21, a storage portion 21a, a rectifier circuit 22, a capacitor 22a, the power receiving coil 23, a DC voltage converter 24, a wireless LAN communication portion 25, an antenna 25a, the secondary battery 26, a receiving AC voltage measurement portion 27, a receiving DC voltage measurement portion 28, and a load power measurement portion 29. The wireless LAN communication portion 25 is an example of the "power receiving apparatus side communication portion" in the present invention.

As shown in FIG. 2, the power receiving coil 23 is configured to receive electric power through the power feeding magnetic field generated by the power feeding coil 13. As shown in FIG. 4, the capacitor 22a is connected in parallel to the power receiving coil 23, and the rectifier circuit 22 including a diode etc. and the capacitor 22a are configured to rectify an AC voltage received by the power receiving coil 23 to a DC voltage. The DC voltage converter 24 is configured to convert the rectified DC voltage into a fixed DC voltage suitable for charging the secondary battery 26. When an input voltage is Va or Vb, for example, an output voltage becomes Vc in the case of either voltage. The secondary battery 26 electrically connected to the DC voltage converter 24 and configured to be applied with the voltage converted into the fixed DC voltage to be charged is provided.

According to the first embodiment, the CPU 21 is configured to open a switch 27a at a prescribed time interval and control the receiving AC voltage measurement portion 27 to measure and acquire a receiving AC voltage value V2 received through a power feeding magnetic field of the power receiving coil 23, as shown in FIG. 4. The CPU 21 is configured to control the receiving DC voltage measurement portion 28 to measure a receiving DC voltage value that is a value of the DC voltage rectified by the rectifier circuit 22. Furthermore, the CPU 21 is configured to control the load power measurement portion 29 to measure the output current of the DC voltage converter 24 in order to measure the load power value of the secondary battery 26.

According to the first embodiment, the power feeding apparatus side control portion 11 is configured to perform control of acquiring model information about the electric vehicle 2 through the wireless LAN communication portion 15 and determining whether or not to start feeding voltage control on the basis of the acquired model information, as shown in FIG. 2.

As shown in FIG. 4, the CPU 21 is configured to perform control of transmitting the model information about the electric vehicle 2, the Q value (quality factor) Q2 of the power receiving coil 23, the inductance L2 of the power receiving coil 23, and the resistance value r2 of the power receiving coil 23 that are previously stored in the storage portion 21a to the power feeding apparatus 1 through the wireless LAN communication portion 25. The transmitted information is received by the power feeding apparatus side control portion 11 through the wireless LAN communication portion 15 of the power feeding apparatus 1.

The power feeding apparatus side control portion 11 determines whether or not the power feeding apparatus 1 can feed electric power to the model of the electric vehicle 2 on the basis of the acquired model information about the electric vehicle 2. When the model of the electric vehicle 2 is checked with the model information about the electric vehicle 2 to which electric power can be fed, previously set in the power feeding apparatus side control portion 11 and matches the same, for example, the power feeding apparatus side control portion 11 determines that the electric vehicle 2 falls into a model to which electric power can be fed. In other words, the power feeding apparatus side control portion 11 is configured to authenticate the electric vehicle 2.

The power feeding apparatus side control portion 11 is configured to calculate a coupling coefficient k on the basis of information acquired from the electric vehicle 2, the inductance L1 of the power feeding coil 13 and the Q value Q1 of the power feeding coil 13 previously set in the power feeding apparatus side control portion 11, and the feeding voltage value V1 measured and acquired by the feeding voltage measurement portion 14. According to the first embodiment, the coupling coefficient k is calculated with the following formula (1) when the inductance of the power feeding coil 13 is set to L1, the inductance of the power receiving coil 23 is set to L2, the feeding voltage value of the power source portion 12 is set to V1, and the receiving AC voltage value that is a value of the AC voltage of the power receiving coil 23 is set to V2.

$$k = (V2/V1) \cdot \sqrt{L1/L2} \tag{1}$$

Figure 5:
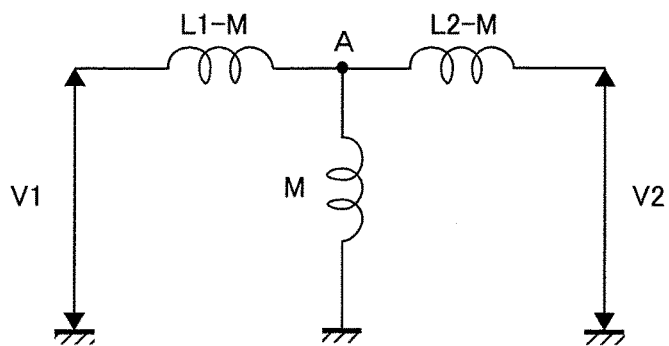
FIG. 5 is a diagram for illustrating a coupling coefficient according to the first embodiment of the present invention.

A derivation method of the formula (1) and a relationship between the coupling coefficient k and a distance D (see FIG. 1) are now described with reference to FIG. 5. A mutual inductance M between the power feeding coil 13 and the power receiving coil 23 can be expressed as the following formula (2) with the coupling coefficient k. As shown in FIG. 5, a voltage becomes the receiving AC voltage value V2 at a point A when a current flowing into the power receiving coil 23 is 0, and hence V2 can be expressed as the following formula (3). The coupling coefficient k shown by the aforementioned formula (1) can be expressed by substituting M of the formula (2) into M of the formula (3). In other words, it is known that the mutual inductance M is changed when the distance D (see FIG. 1) between the power feeding coil 13 and the power receiving coil 23 is changed, and hence the coupling coefficient k is changed when the mutual inductance M is changed.

$$M = k \cdot \sqrt{L1 \times L2} \tag{2}$$

$$V2 = \frac{M}{L1} V1 \tag{3}$$

According to the first embodiment, the power feeding apparatus side control portion 11 is configured not to feed electric power when the calculated coupling coefficient k is less than 0.03. Thus, when the distance D between the power feeding apparatus 1 and the electric vehicle 2 is significantly large or when extraneous material or the like blocking power feeding exists between the power feeding coil 13 and the power receiving coil 23, the power feeding apparatus side control portion 11 performs control of not starting power feeding or control of stopping power feeding.

According to the first embodiment, the CPU 21 is configured to perform control of transmitting the receiving DC voltage value that is a value of the DC voltage obtained by rectifying the measured AC voltage of the power receiving coil 23 and the measured load power value of the electric vehicle 2 to the power feeding apparatus 1 through the wireless LAN communication portion 25, as shown in FIG. 4. The power feeding apparatus side control portion 11 is configured to acquire the aforementioned receiving DC voltage value and load power value through the wireless LAN communication portion 15. The power feeding apparatus side control portion 11 is configured to set a target receiving voltage value of the receiving DC voltage value in the case where the power transmission efficiency is in the vicinity of a maximum on the basis of the load power value, the coupling coefficient k, and the receiving AC voltage value V2 and perform the feeding voltage control such that the acquired receiving DC voltage value becomes the set target receiving voltage value.

Specifically, the power feeding apparatus side control portion 11 is configured to calculate load resistance $R_L$ in the case where the power transmission efficiency is in the vicinity of the maximum. The load resistance $R_L$ can be expressed as the following formula (4) when the coupling coefficient is set to k, the resistance value of the power receiving coil 23 is set to r2, the Q value of the power receiving coil 23 is set to Q2, and the Q value of the power feeding coil 13 is set to Q1.

$$R_L = \frac{r2 \cdot Q2}{k} \sqrt{\frac{Q2}{Q1}} \quad (4)$$

According to the first embodiment, the power feeding apparatus side control portion 11 is configured to perform control of setting the receiving DC voltage value to the target receiving voltage value, which is a receiving DC voltage value for obtaining the load resistance $R_L$ in the case where the power transmission efficiency is in the vicinity of the maximum, on the basis of the acquired load power value. When the load resistance $R_L$ in the case where the load power value is 5 W and the power transmission efficiency is in the vicinity of the maximum is 400Ω, for example, the target receiving voltage value E can be expressed as the following formula (5). In this case, the target receiving voltage value E is 44.7 V.

$$E=\sqrt{5W \times 400\Omega}=44.7V \quad (5)$$

According to the first embodiment, the power feeding apparatus side control portion 11 is configured to perform the feeding voltage control such that the acquired receiving DC voltage value becomes the set target receiving voltage value, as shown in FIG. 2. Specifically, the CPU 21 is configured to transmit the receiving DC voltage value measured by the receiving DC voltage measurement portion 28 to the power feeding apparatus 1 through the wireless LAN communication portion 25. The power feeding apparatus side control portion 11 is configured to receive and acquire the receiving DC voltage value V2 through the wireless LAN communication portion 15 and adjust the feeding voltage value V1 of the AC-DC converter 12a such that the receiving DC voltage value becomes the target receiving voltage value on the basis of a comparison between the acquired receiving DC voltage value and the set target receiving voltage value.

A difference in the power transmission efficiency between the case where the load resistance $R_L$ is set such that the power transmission efficiency is in the vicinity of the maximum and the case where the load resistance $R_L$ is maintained constant is now described with reference to FIGS. 6 to 8.

Figure 6:
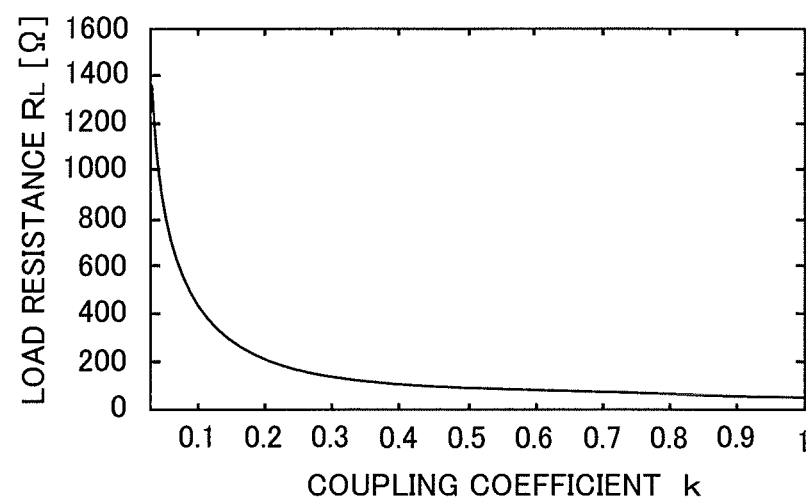
FIG. 6 is a diagram for illustrating a relationship between the coupling coefficient and load resistance according to the first embodiment of the present invention.

As shown in FIG. 6, the load resistance $R_L$ in the case where the power transmission efficiency is in the vicinity of the maximum is expressed by a relationship to the coupling coefficient k. FIG. 6 shows the case where the load resistance $R_L$ in the case where the power transmission efficiency is in the vicinity of the maximum is calculated, setting the frequency of the feeding voltage to 6.78 MHz, the inductances (L1 and L2) of the power feeding coil 13 and the power receiving coil 23 to 1 μH, the Q values (Q1 and Q2) of the power feeding coil 13 and the power receiving coil 23 to 100, the capacitor 22a to a value for resonating with the power receiving coil 23, and the resonance capacitor 12d to a value for setting the imaginary part of the impedance of the power feeding coil 13 to 0 as observed from the FETs 12b and the gate drive circuit 12c. For example, a state where the coupling coefficient k is large denotes a state where the distance D between the power feeding coil 13 and the power receiving coil 23 is small, and a state where the coupling coefficient k is small denotes a state where the distance D between the power feeding coil 13 and the power receiving coil 23 is large.

Figure 7:
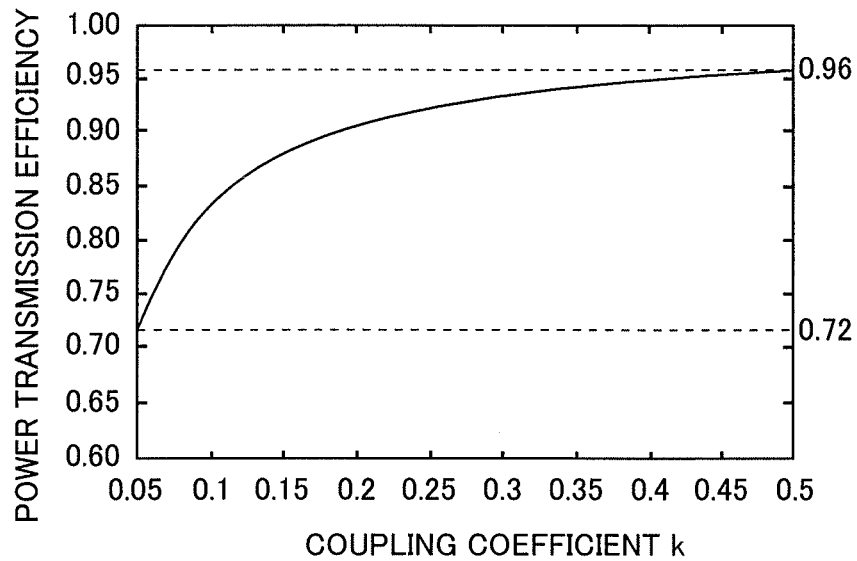
FIG. 7 is a diagram for illustrating a relationship between the coupling coefficient and power transmission efficiency according to the first embodiment of the present invention.
Figure 8:
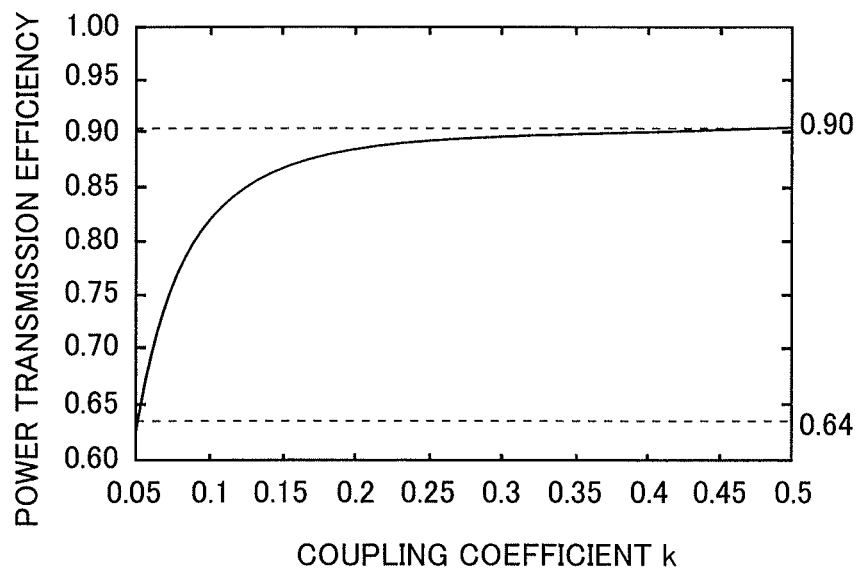
FIG. 8 is a diagram for illustrating a relationship between the coupling coefficient and the power transmission efficiency according to the first embodiment of the present invention.

FIG. 7 shows a relationship between a value of the coupling coefficient k and a value of the power transmission efficiency in the case where the load resistance $R_L$ is set such that the power transmission efficiency is in the vicinity of the maximum (see FIG. 6). On the other hand, FIG. 8 shows a relationship between the coupling coefficient k and a value of the power transmission efficiency in the vicinity of the maximum in the case where the load resistance $R_L$ is maintained constant (426Ω). When the graphs of FIGS. 7 and 8 are compared with each other, in the case where the coupling coefficient k is 0.05, for example, the power transmission efficiency in the vicinity of the maximum is 0.72 (see FIG. 7) whereas the power transmission efficiency in the case where the load resistance $R_L$ is 426Ω is 0.64 (see FIG. 8). In the case where the coupling coefficient k is 0.5, the power transmission efficiency in the vicinity of the maximum is 0.96 (see FIG. 7) whereas the power transmission efficiency in the case where the load resistance $R_L$ is 426Ω is 0.90 (see FIG. 8). Therefore, the power transmission efficiency in the case where the load resistance $R_L$ is set such that the power transmission efficiency is in the vicinity of the maximum (see FIG. 6) is larger than the power transmission efficiency in the case where the load resistance $R_L$ is maintained constant.

Contactless power feeding control processing performed by the contactless power feeding system 100 according to the first embodiment is now described with reference to FIG. 9. Processing in the power feeding apparatus 1 is performed by the CPU 11a.

Figure 9:
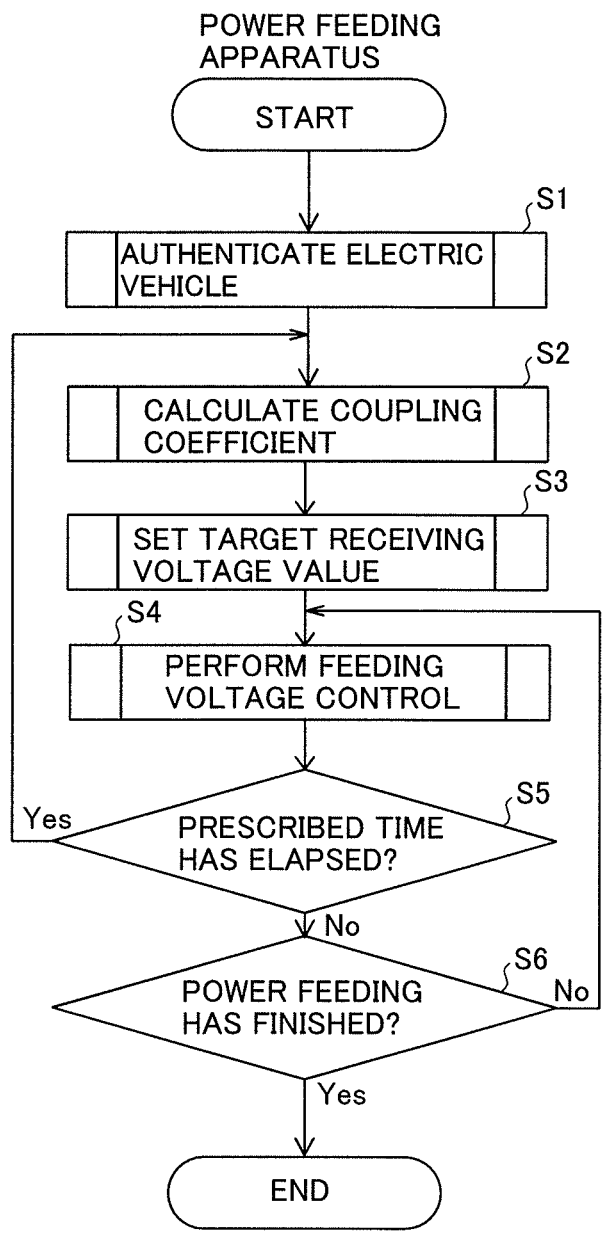
FIG. 9 is a flowchart for illustrating contactless power feeding control processing performed by the contactless power feeding system according to the first embodiment of the present invention.

First, in the power feeding apparatus 1, the CPU 11a authenticates the electric vehicle 2 as described later (see FIG. 10) at a step S1, as shown in FIG. 9. Then, the CPU 11a advances to a step S2 and calculates the coupling coefficient k as described later (see FIG. 11) at the step S2. Then, the CPU 11a advances to a step S3.

At the step S3, the CPU 11a sets the target receiving voltage value as described later (see FIG. 12). Then, the CPU 11a advances to a step S4 and performs the feeding voltage control as described later (see FIG. 13) at the step S4. Then, the CPU 11a advances to a step S5.

At the step S5, the CPU 11a determines whether or not a prescribed time has elapsed. When determining that the prescribed time has elapsed at the step S5, the CPU 11a returns to the step S2, and when determining that the prescribed time has not elapsed, the CPU 11a advances to a step S6.

At the step S6, the CPU 11a determines whether or not power feeding has finished. When determining that power feeding has not finished at the step S6, the CPU 11a returns to the step S4, and when determining that power feeding has finished, the CPU 11a terminates the contactless power feeding control processing.

Electric vehicle authentication processing performed by the contactless power feeding system 100 according to the first embodiment is now described with reference to FIG. 10. Processing in the power feeding apparatus 1 is performed by the CPU 11a. Processing in the electric vehicle 2 is performed by the CPU 21.

Figure 10:
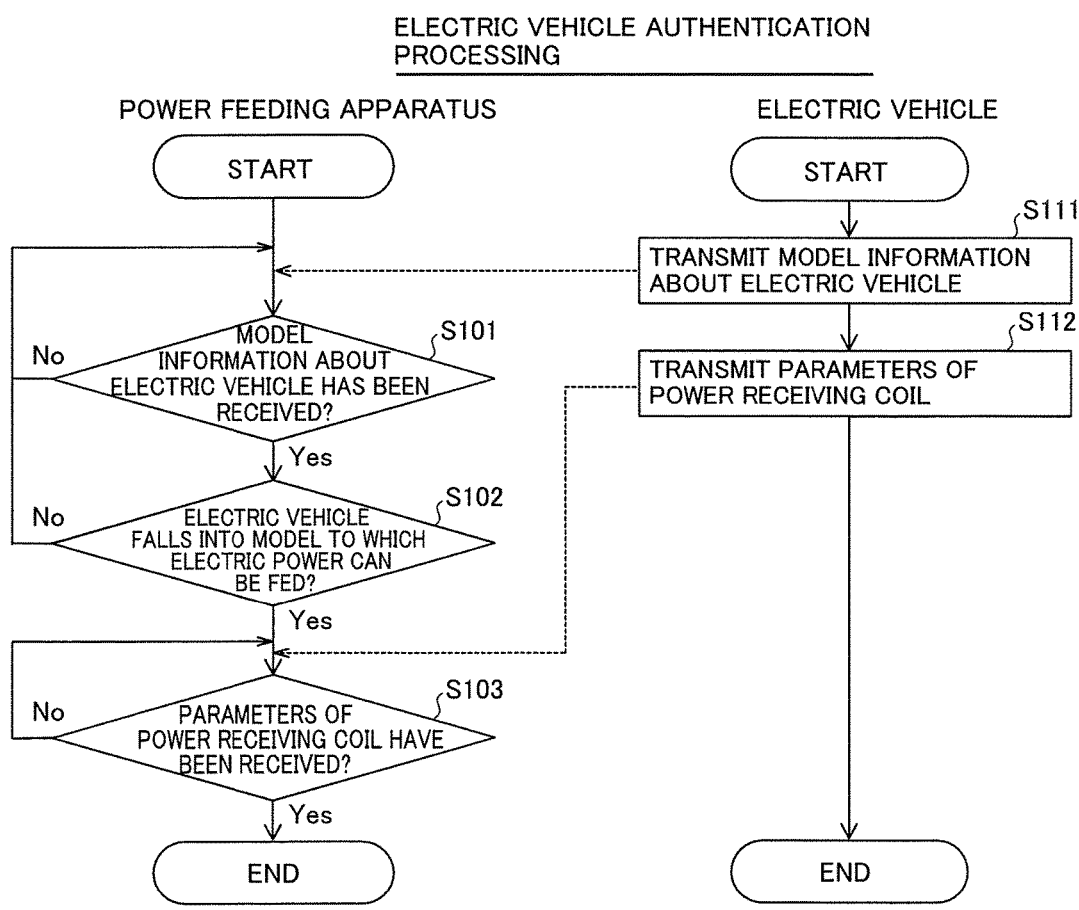
FIG. 10 is a flowchart for illustrating electric vehicle authentication processing performed by the contactless power feeding system according to the first embodiment of the present invention.

First, in the electric vehicle 2, the CPU 21 transmits the model information about the electric vehicle 2 at a step S111, as shown in FIG. 10. Specifically, the CPU 21 transmits the model information previously stored in the storage portion 21a to the power feeding apparatus 1 through the wireless LAN communication portion 25. Then, the CPU 21 advances to a step S112. At the step S112, the CPU 21 transmits parameters of the power receiving coil 23 to the power feeding apparatus 1 through the wireless LAN communication portion 25. The parameters of the power receiving coil 23 are the inductance L2, the resistance value r2, and the Q value Q2 of the power receiving coil 23.

In the power feeding apparatus 1, the CPU 11a determines whether or not the model information about the electric vehicle 2 has been received at a step S101. The CPU 11a repeats this determination until the model information about the electric vehicle 2 has been received and advances to a step S102 when determining that the model information about the electric vehicle 2 has been received.

According to the first embodiment, the CPU 11a determines whether or not the electric vehicle 2 falls into a model to which electric power can be fed at the step S102. When determining that the electric vehicle 2 does not fall into the model to which electric power can be fed, the CPU 11a returns to the step S101, and when determining that the electric vehicle 2 falls into the model to which electric power can be fed, the CPU 11a advances to a step S103.

At the step S103, the CPU 11a determines whether or not the parameters of the power receiving coil 23 have been received. The CPU 11a repeats this determination until the parameters of the power receiving coil 23 have been received, and the electric vehicle authentication processing is terminated after the parameters of the power receiving coil 23 have been received.

Figure 11:
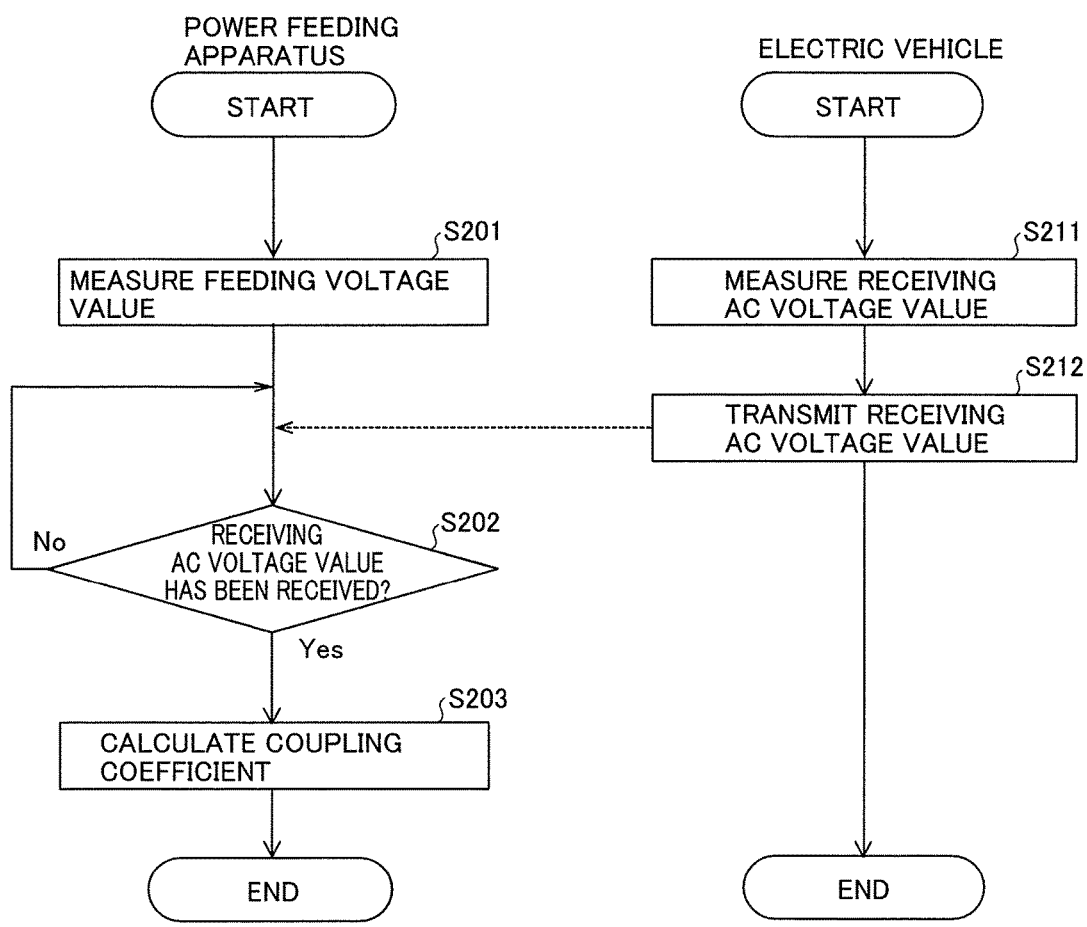
FIG. 11 is a flowchart for illustrating coupling coefficient calculation processing performed by the contactless power feeding system according to the first embodiment of the present invention.

Coupling coefficient calculation processing performed by the contactless power feeding system 100 according to the first embodiment is now described with reference to FIG. 11. Processing in the power feeding apparatus 1 is performed by the CPU 11a. Processing in the electric vehicle 2 is performed by the CPU 21.

First, in the electric vehicle 2, the CPU 21 measures the receiving AC voltage value V2 at a step S211. Specifically, as shown in FIG. 4, the CPU 21 opens the switch 27a and controls the receiving AC voltage measurement portion 27 to measure the receiving AC voltage value V2 of the power receiving coil 23 (see FIG. 4). The influence of the current flowing into the power receiving coil 23 can be eliminated by measuring the receiving AC voltage value V2 in a state where the switch 27a is opened. Then, the CPU 21 advances to a step S212. At the step S212, the CPU 21 transmits the measured receiving AC voltage value V2 to the power feeding apparatus 1 through the wireless LAN communication portion 25, as shown in FIG. 11.

In the power feeding apparatus 1, the CPU 11a measures the feeding voltage value V1 at a step S201. Specifically, the CPU 11a controls the feeding voltage measurement portion 14 to measure the feeding voltage value V1 of the power source portion 12. Then, the CPU 11a advances to a step S202.

At the step S202, the CPU 11a determines whether or not the receiving AC voltage value V2 has been received. The CPU 11a repeats this determination until the receiving AC voltage value V2 has been received and advances to a step S203 when determining that the receiving AC voltage value V2 has been received.

According to the first embodiment, the CPU 11a calculates the coupling coefficient k at the step S203. Specifically, the CPU 11a calculates the coupling coefficient k on the basis of the measured feeding voltage value V1, the received receiving AC voltage value V2, the parameter (inductance L2) of the power receiving coil acquired through the electric vehicle authentication processing (see FIG. 10), the parameter (inductance L1) of the power feeding coil previously set, and the formula (1). Then, the coupling coefficient calculation processing is terminated.

Target receiving voltage setting processing performed by the contactless power feeding system 100 according to the first embodiment is now described with reference to FIG. 12. Processing in the power feeding apparatus 1 is performed by the CPU 11a. Processing in the electric vehicle 2 is performed by the CPU 21.

Figure 12:
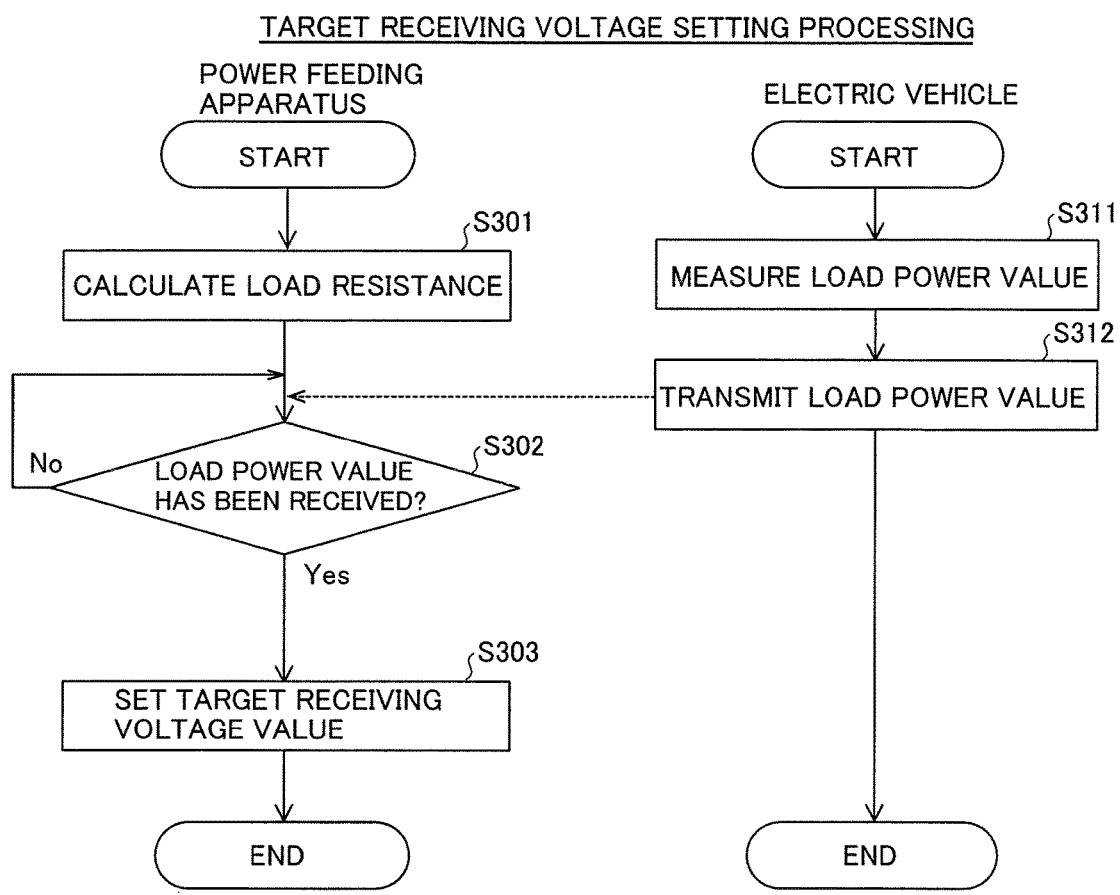
FIG. 12 is a flowchart for illustrating target receiving voltage setting processing performed by the contactless power feeding system according to the first embodiment of the present invention.

First, in the electric vehicle 2, the CPU 21 measures the load power value at a step S311 and thereafter advances to a step S312, as shown in FIG. 12. At the step S312, the CPU 21 transmits the load power value. Specifically, the CPU 21 acquires the load power value of the secondary battery 26 measured by the load power measurement portion 29 and transmits the acquired load power value to the power feeding apparatus 1 through the wireless LAN communication portion 25.

Meanwhile, in the power feeding apparatus 1, the CPU 11a calculates the load resistance $R_L$ at a step S301. Specifically, the CPU 11a calculates the load resistance $R_L$ in the case where the power transmission efficiency is in the vicinity of the maximum. The load resistance $R_L$ in the case where the power transmission efficiency is in the vicinity of the maximum is calculated on the basis of the coupling coefficient k calculated through the aforementioned coupling coefficient calculation processing (see FIG. 11), the resistance value r2 of the power receiving coil 23 acquired through the aforementioned electric vehicle authentication processing (see FIG. 10), and the Q values (Q1 and Q2) of the power feeding coil 13 and the power receiving coil 23. Then, the CPU 11a advances to a step S302.

At the step S302, the CPU 11a determines whether or not the load power value has been received. The CPU 11a repeats this determination until the load power value has been received and advances to a step S303 when determining that the load power value has been received.

According to the first embodiment, the CPU 11a sets the target receiving voltage value at the step S303. Specifically, the CPU 11a sets the target receiving voltage value on the basis of the acquired load power value and the load resistance $R_L$ in the case where the power transmission efficiency is in the vicinity of the maximum. Then, the target receiving voltage setting processing is terminated.

Figure 13:
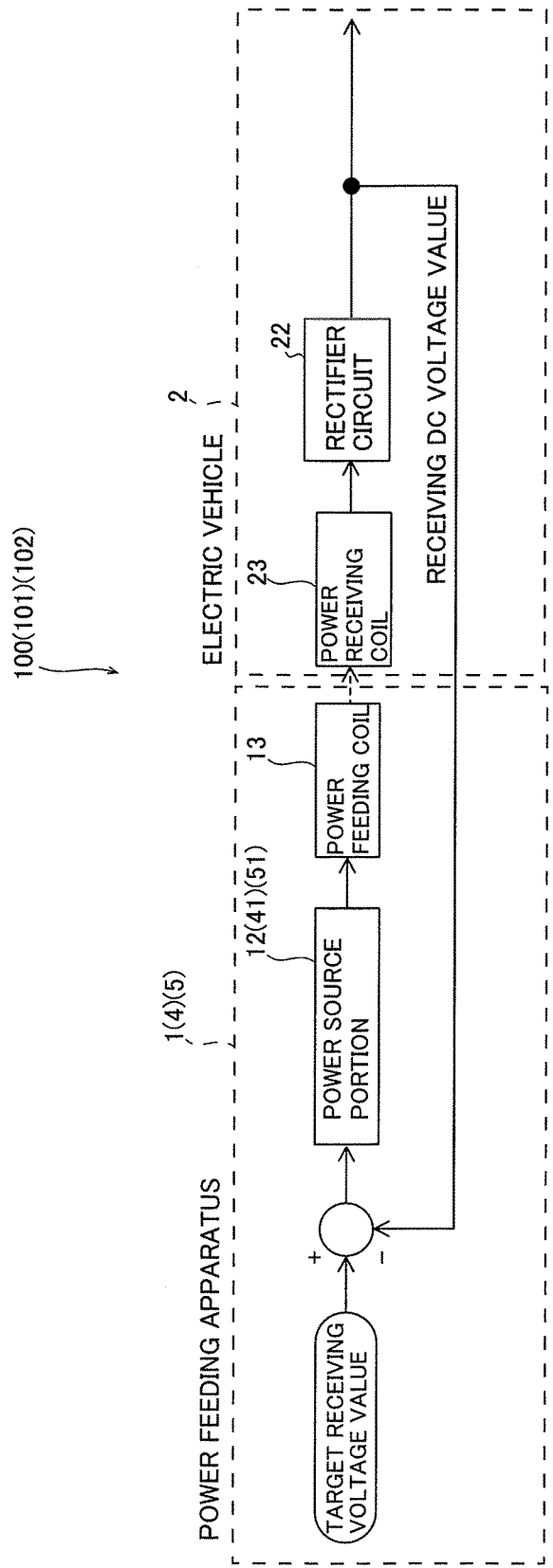
FIG. 13 is a block diagram for illustrating feeding voltage control performed by the contactless power feeding system according to the first embodiment of the present invention.

Feeding voltage control processing performed by the contactless power feeding system 100 according to the first embodiment is now described with reference to FIG. 13. FIG. 13 is a block diagram obtained by simplifying the block diagram of FIG. 2 in order to illustrate the feeding voltage control processing performed by the contactless power feeding system 100.

First, the CPU 11a performs control of adjusting the feeding voltage value V1 of the power source portion 12 on the basis of the comparison (feedback coupling) between the target receiving voltage value and the receiving DC voltage value, as shown in FIG. 13. The adjusted feeding voltage value V1 is transmitted through the power feeding coil 13 and the power receiving coil 23 to be changed to the receiving AC voltage value V2. The receiving AC voltage value V2 is changed to the receiving DC voltage value by the rectifier circuit 22. The CPU 21 measures the receiving DC voltage value by the receiving DC voltage measurement portion 28 and transmits the same to the power feeding apparatus 1 through the wireless LAN communication portion 25. The CPU 11a receives the aforementioned receiving DC voltage value through the wireless LAN communication portion 15 and compares the target receiving voltage value and the receiving DC voltage value with each other. The CPU 11a sets the receiving DC voltage value to the set target receiving voltage value by repeating this control.

According to the first embodiment, the following effects can be obtained.

According to the first embodiment, as hereinabove described, the power feeding apparatus side control portion 11 is configured to perform the feeding voltage control in order to control the feeding voltage value V1 of the power source portion 12 on the basis of the coupling coefficient k between the power feeding coil 13 and the power receiving coil 23 provided outside, receiving electric power through the power feeding magnetic field of the power feeding coil 13 such that the power transmission efficiency to the electric vehicle 2 including the power receiving coil 23 is in the vicinity of the maximum. Thus, the resistance value of the power feeding coil 13 is not increased unlike the case where the power transmission efficiency is maximized by controlling the resistance value of the power feeding coil 13, and hence an increase in power consumption for other than power feeding can be suppressed. Furthermore, the feeding voltage value V1 of the power source portion 12 is controlled on the basis of the coupling coefficient k including the distance D between the power feeding coil 13 and the power receiving coil 23 as an element, whereby the feeding voltage value V1 of the power source portion 12 is controlled according to the distance D between the power feeding coil 13 and the power receiving coil 23 such that the power transmission efficiency to the electric vehicle 2 including the power receiving coil 23 is in the vicinity of the maximum. Consequently, the power transmission efficiency can be increased regardless of the distance D between the power feeding coil 13 and the power receiving coil 23.

According to the first embodiment, as hereinabove described, the power feeding apparatus 1 further includes the wireless LAN communication portion 15 communicating with the electric vehicle 2, and the power feeding apparatus side control portion 11 is configured to perform control of acquiring the inductance L2 of the power receiving coil 23 and the receiving AC voltage value V2 that is the value of the AC voltage of the power receiving coil 23 received through the power feeding magnetic field from the electric vehicle 2 through the wireless LAN communication portion 15 and calculating the coupling coefficient k on the basis of the acquired inductance L2 and receiving AC voltage value V2 of the power receiving coil 23, the inductance L1 of the power feeding coil 13, and the feeding voltage value V1 of the power source portion 12. Thus, the information about the power receiving coil 23 can be acquired through the wireless LAN communication portion 15, and the coupling coefficient k according to the type of the electric vehicle 2 and the distance D between the power feeding coil 13 and the power receiving coil 23 can be calculated on the basis of the acquired information. Consequently, the power feeding apparatus side control portion 11 can perform the feeding voltage control according to the electric vehicle 2 and the distance D between the power feeding coil 13 and the power receiving coil 23 such that the power transmission efficiency is in the vicinity of the maximum.

According to the first embodiment, as hereinabove described, the power feeding apparatus side control portion 11 is configured to acquire the receiving DC voltage value that is the value of the DC voltage obtained by rectifying the AC voltage of the power receiving coil 23 and the load power value of the electric vehicle 2 through the wireless LAN communication portion 15, and the power feeding apparatus side control portion 11 is configured to set the target receiving voltage value of the receiving DC voltage value in the case where the power transmission efficiency is in the vicinity of the maximum on the basis of the acquired load power value of the electric vehicle 2, the coupling coefficient k, and the receiving AC voltage value V2 and perform the feeding voltage control such that the acquired receiving DC voltage value becomes the set target receiving voltage value. Thus, feedback control can be performed such that the receiving DC voltage value becomes the target receiving voltage value, and hence the power feeding apparatus side control portion 11 can more accurately perform the feeding voltage control such that the power transmission efficiency is in the vicinity of the maximum even when the load power value is changed.

According to the first embodiment, as hereinabove described, the power feeding apparatus side control portion 11 is configured to perform control of calculating the load resistance $R_L$ in the case where the power transmission efficiency is in the vicinity of the maximum on the basis of the coupling coefficient k, the resistance value r2 of the power receiving coil 23, the Q value (quality factor) of the power receiving coil 23, and the Q value (quality factor) of the power feeding coil 13 and setting the target receiving voltage value corresponding to the load resistance $R_L$. Thus, the load resistance $R_L$ is calculated according to the resistance value r2 of the power receiving coil 23 and the Q value (quality factor) of the power receiving coil 23, and hence the target receiving voltage value can be set according to the characteristics of the power receiving coil 23 to perform the feedback control.

According to the first embodiment, as hereinabove described, the power feeding apparatus side control portion 11 is configured to perform control of setting the target receiving voltage value corresponding to the load resistance $R_L$, using a value of a square root of a value obtained by multiplying the load power value of the electric vehicle 2 by the load resistance $R_L$. Thus, the target receiving voltage value corresponding to the load resistance $R_L$ can be easily set.

According to the first embodiment, as hereinabove described, the power feeding apparatus side control portion 11 is configured to perform control of acquiring the receiving AC voltage value V2 at a prescribed time interval. Thus, the coupling coefficient k is calculated at the prescribed time interval on the basis of the acquired receiving AC voltage value V2, and hence even when the coupling coefficient k is changed during power feeding, the power feeding apparatus side control portion 11 can perform the feeding voltage control according to the change such that the power transmission efficiency is in the vicinity of the maximum.

According to the first embodiment, as hereinabove described, the power feeding apparatus side control portion 11 is configured to perform control of calculating the coupling coefficient k with the aforementioned formula (1), setting the inductance of the power feeding coil 13 to L1, the inductance of the power receiving coil 23 to L2, the feeding voltage value of the power source portion 12 to V1, and the receiving AC voltage value that is the value of the AC voltage of the power receiving coil 23 to V2. Thus, the coupling coefficient k can be easily calculated on the basis of the formula (1), and hence the power feeding apparatus side control portion 11 can easily control the feeding voltage value V1 of the power source portion 12 such that the power transmission efficiency is in the vicinity of the maximum.

According to the first embodiment, as hereinabove described, the formula (1) is derived from the formula (2) used to calculate the mutual inductance M between the power feeding coil 13 and the power receiving coil 23 and the formula (3) used to calculate the receiving AC voltage value V2. Thus, the coupling coefficient k can be more easily calculated by deriving the formula (1) on the basis of the formula (2) and the formula (3).

According to the first embodiment, as hereinabove described, the power feeding apparatus side control portion 11 is configured not to feed electric power when the coupling coefficient k is smaller than a prescribed value (0.03, for example). Thus, no electric power is fed when the maximized power transmission efficiency is low, and hence wasted power consumption can be suppressed. Furthermore, power consumption for other than power feeding is suppressed, and hence heat generation in the power feeding apparatus 1 and the electric vehicle 2 is suppressed.

According to the first embodiment, as hereinabove described, the power feeding apparatus 1 further includes the wireless LAN communication portion 15 communicating with the electric vehicle 2, and the power feeding apparatus side control portion 11 is configured to perform control of acquiring the model information about the electric vehicle 2 through the wireless LAN communication portion 15 and determining whether or not to start the feeding voltage control on the basis of the acquired model information. Thus, the power feeding apparatus side control portion 11 can start the feeding voltage control only on the electric vehicle 2 previously allowed to be fed with electric power.

According to the first embodiment, as hereinabove described, the power source portion 12 includes the resonance capacitor 12d, the voltage variable AC-DC converter 12a, and the switching circuit generating the AC by turning on/off the DC voltage from the AC-DC converter 12a at the resonance frequency of the power feeding coil 13 and the resonance capacitor 12d. Thus, the electromagnetic field can be resonated between the power feeding coil 13 and the power receiving coil 23, and the power feeding apparatus side control portion 11 can perform the feeding voltage control while keeping a power factor high. Therefore, power consumption for other than power feeding can be reduced.

According to the first embodiment, as hereinabove described, the resonance capacitor 12d is connected in series to the power feeding coil 13. Thus, the impedance of the resonance capacitor 12d and the power feeding coil 13 connected in series to each other is minimized when the resonance capacitor 12d and the power feeding coil 13 are driven at the resonance frequency. In the switching circuit (the FETs 12b and the gate drive circuit 12c), the impedance is small as compared with the case where a sine-wave generator and a variable amplifier are provided. Therefore, the impedance of the resonance capacitor 12d and the power feeding coil 13 connected in series to each other and the impedance of the switching circuit (the FETs 12b and the gate drive circuit 12c) can be easily matched.

According to the first embodiment, as hereinabove described, the switching circuit is a half-bridge switching circuit including the gate drive circuit 12c and the two FETs 12b. Thus, the switching circuit can be easily configured as compared with the case where a full-bridge switching circuit is provided.

Second Embodiment

The structure of a contactless power feeding system 101 according to a second embodiment is now described with reference to FIG. 14. In the second embodiment, the contactless power feeding system 101 includes a power feeding apparatus 4 including a power source portion 41 provided with a so-called full-bridge switching circuit constituted by a gate drive circuit 41a and four FETs 12b, unlike the contactless power feeding system 100 according to the first embodiment including the power source portion 12 provided with the so-called half-bridge switching circuit constituted by the gate drive circuit 12c and the two FETs 12b.

Figure 14:
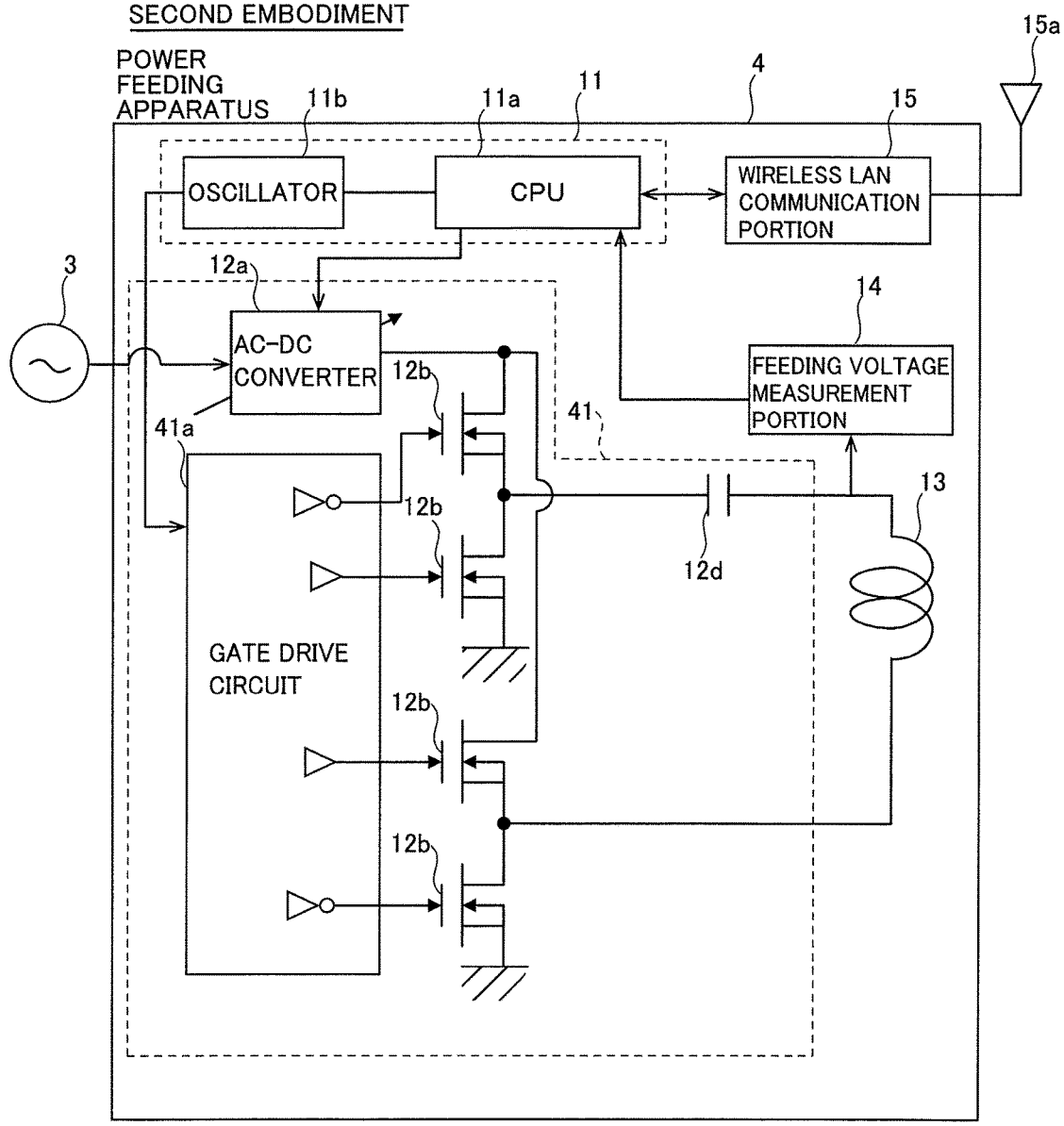
FIG. 14 is a block diagram showing the structure of a power feeding apparatus according to a second embodiment of the present invention.

Specifically, the single gate drive circuit 41a is electrically connected to the four FETs 12b, and two of the four FETs 12b are provided on a first side of a power feeding coil 13 while the remaining two are provided on a second side of the power feeding coil 13, as shown in FIG. 14. One of the two FETs 12b on each of the first and second sides is electrically connected to an AC-DC converter 12a, and the remaining one on each of the first and second sides is grounded. A power feeding apparatus side control portion 11 is configured to alternately generate a feeding voltage value V1 and a feeding voltage value −V1 by turning on/off the four FETs 12b at a resonance frequency of a resonance capacitor 12d and the power feeding coil 13. The remaining structure of the contactless power feeding system 101 according to the second embodiment is similar to that of the contactless power feeding system 100 according to the first embodiment.

According to the second embodiment, the following effects can be obtained.

According to the second embodiment, as hereinabove described, the power feeding apparatus 4 includes the power source portion 41 provided with the so-called full-bridge switching circuit constituted by the gate drive circuit 41a and the four FETs 12b. Thus, the feeding voltage value V1 capable of being fed to the power feeding coil 13 can be doubled as compared with the case where the half-bridge switching circuit is provided, when the same AC-DC converter 12a is used. When the maximum value of a voltage output by the AC-DC converter 12a is 5 V, for example, the range of the feeding voltage value V1 is at least 0 V to not more than 5 V in the half-bridge switching circuit. On the other hand, in the full-bridge switching circuit, the range of the feeding voltage value V1 is at least −5 V to not more than 5 V, and hence the feeding voltage value V1 generated at the end of the power feeding coil 13 can be doubled. Consequently, a larger AC can be flowed into the power feeding coil 13, and hence a large power feeding magnetic field can be generated.

Third Embodiment

The structure of a contactless power feeding system 102 according to a third embodiment is now described with reference to FIG. 15. In the third embodiment, the contactless power feeding system 102 includes a power feeding apparatus 5 in which a power source portion 51 includes a variable amplifier 51a configured to be capable of amplifying a sine-wave AC, unlike the contactless power feeding system 100 according to the first embodiment including the power feeding apparatus 1 provided with the power source portion 12 including the so-called switching circuit having the AC-DC converter 12a, the gate drive circuit 12c, and the two FETs 12b.

Figure 15:
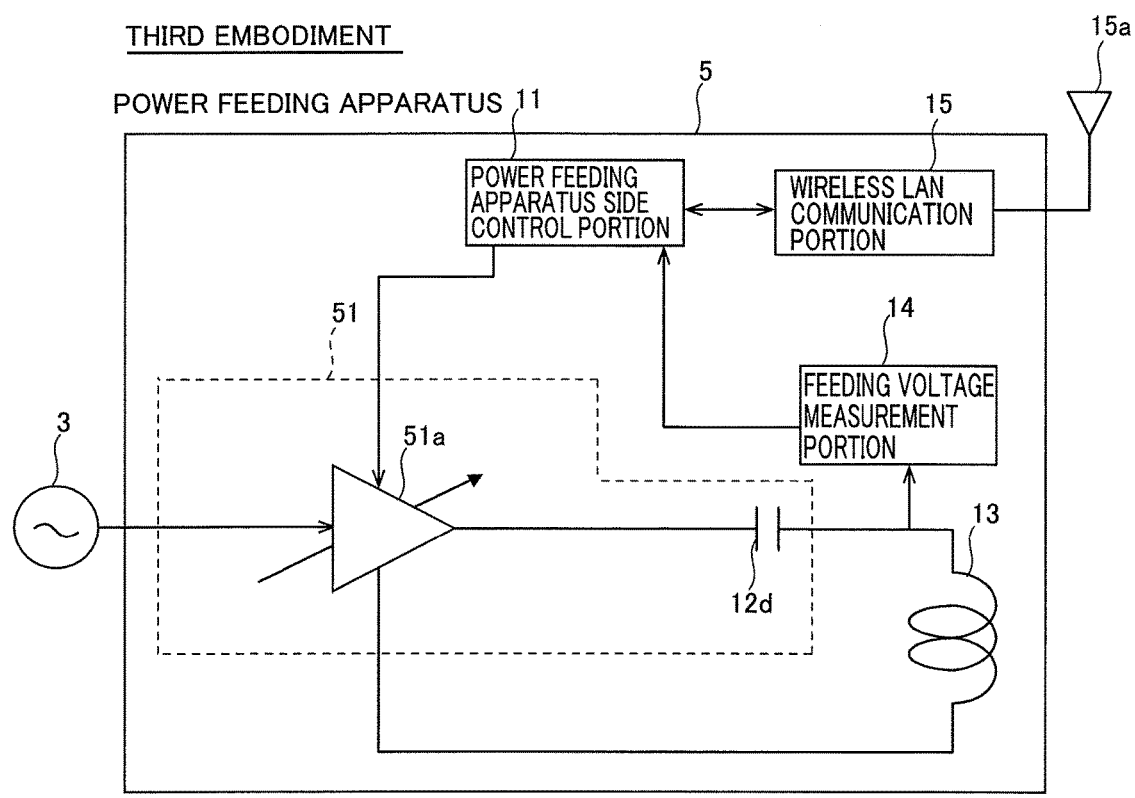
FIG. 15 is a block diagram showing the structure of a power feeding apparatus according to a third embodiment of the present invention.

Specifically, a first output end of the variable amplifier 51a is connected to a resonance capacitor 12d while a second output end thereof is connected to one end of a power feeding coil 13, and the variable amplifier 51a is electrically connected to an AC power source 3 configured to supply electric power for amplification and a power feeding apparatus side control portion 11 controlling a feeding voltage value V1, as shown in FIG. 15. The power feeding apparatus side control portion 11 is configured to control the feeding voltage value V1 of the variable amplifier 51a such that the receiving DC voltage value of an electric vehicle 2 becomes a target receiving voltage value. The remaining structure of the contactless power feeding system 102 according to the third embodiment is similar to that of the contactless power feeding system 100 according to the first embodiment.

According to the third embodiment, the following effects can be obtained.

According to the third embodiment, as hereinabove described, the power feeding apparatus 5 includes the power source portion 51 having the variable amplifier 51a configured to be capable of amplifying the sine-wave AC. Thus, the sine-wave AC can be fed to the power feeding coil 13, and hence the high frequency of a feeding voltage can be suppressed unlike the case where the switching circuit is employed. Thus, electromagnetic interference of high-frequency noise to a peripheral device can be reduced.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the power receiving apparatus according to the present invention is applied to the electric vehicle in each of the aforementioned first to third embodiments, the present invention is not restricted to this. The power receiving apparatus according to the present invention may alternatively be applied to other than the electric vehicle. For example, the power receiving apparatus according to the present invention may be applied to an electric train or the like.

While the power feeding apparatus calculates the coupling coefficient in each of the aforementioned first to third embodiments, the present invention is not restricted to this. According to the present invention, the CPU of the electric vehicle may alternatively calculate the coupling coefficient.

While the target receiving voltage value is calculated with the formula (5) as a method for setting the target receiving voltage value in each of the aforementioned first to third embodiments, the present invention is not restricted to this. According to the present invention, the target receiving voltage value may alternatively be selected from a correspondence table or the like previously prepared on the basis of the acquired load power value and a value of the load resistance in the case where the power transmission efficiency is in the vicinity of the maximum.

While the power feeding apparatus includes the single power feeding coil in each of the aforementioned first to third embodiments, the present invention is not restricted to this. According to the present invention, a power feeding apparatus including a plurality of power feeding coils may alternatively be employed. For example, three-phase AC may be flowed into three power feeding coils, and a motor may be driven as a load.

While a wireless LAN is employed as the communication portion in each of the aforementioned first to third embodiments, the present invention is not restricted to this. According to the present invention, communication means other than the wireless LAN may alternatively be employed as the communication portion. For example, information may alternatively be communicated by a load modulation method utilizing the load modulation of the power feeding coil and the power receiving coil. In this case, the antenna or the like of the communication portion is not required to be provided separately, and hence the structure of the contactless power feeding system can be simplified. Furthermore, Bluetooth (registered trademark), a specified low power radio, a feeble radio, or the like may alternatively be employed as the communication portion.

While the resonance capacitor of the power feeding apparatus is connected in series to the power feeding coil in each of the aforementioned first to third embodiments, the present invention is not restricted to this. According to the present invention, the resonance capacitor of the power feeding apparatus may alternatively be connected in parallel to the power feeding coil.

While the capacitor of the power receiving apparatus is connected in parallel to the power receiving coil in each of the aforementioned first to third embodiments, the present invention is not restricted to this. According to the present invention, the capacitor of the power receiving apparatus may alternatively be connected in series to the power receiving coil. In this case, load resistance in the case where the power transmission efficiency is in the vicinity of the maximum can be reduced as compared with the case where the capacitor of the power receiving apparatus is connected in parallel to the power receiving coil. Thus, a set value of the target receiving voltage value can be lowered.

While the prescribed value of the coupling coefficient in the case where no electric power is fed is less than 0.03 in each of the aforementioned first to third embodiments, the present invention is not restricted to this. According to the present invention, the prescribed value of the coupling coefficient in the case where no electric power is fed may alternatively be other than 0.03.

While no electric power is fed when the coupling coefficient is smaller than the prescribed value in each of the aforementioned first to third embodiments, the present invention is not restricted to this. For example, a user may alternatively be notified when the coupling coefficient is smaller than the prescribed value.

While the target receiving voltage value (44.7 V in the first embodiment) is set without considering the voltage conversion efficiency of the DC voltage converter in each of the aforementioned first to third embodiments, the present invention is not restricted to this. When the efficiency of the DC voltage converter is set to 90% and the voltage loss of the rectifier circuit is set to 2 V, for example, for example, the target receiving voltage value is 46.2 V. In other words, the power transmission efficiency can be in the vicinity of the maximum more accurately if control is performed in consideration of a loss or the like in the circuit.

While the processing operations performed by the control portion according to the present invention are described, using the flowcharts described in a flow-driven manner in which processing is performed in order along a control processing flow for the convenience of illustration in each of the aforementioned first to third embodiments, the present invention is not restricted to this. According to the present invention, the processing operations performed by the control portion may alternatively be performed in an event-driven manner in which processing is performed on an event basis. In this case, the processing operations performed by the control portion may be performed in a complete event-driven manner or in a combination of an event-driven manner and a flow-driven manner.

What is claimed is:

1. A contactless power feeding apparatus comprising:
a power source portion capable of changing a feeding voltage value;
a power feeding coil generating a power feeding magnetic field by supply of an AC thereto from the power source portion;
a power feeding apparatus side control portion controlling the feeding voltage value of the power source portion; and
a communication portion communicating with a power receiving apparatus, wherein
the power feeding apparatus side control portion that acquires a coupling coefficient between the power feeding coil and a power receiving coil provided outside, receiving electric power through the power feeding magnetic field of the power feeding coil, and performs feeding voltage control in order to control the feeding voltage value of the power source portion on the basis of the coupling coefficient; and
the power feeding apparatus side control portion performs control of acquiring an inductance of the power receiving coil and a receiving AC voltage value that is a value of an AC voltage of the power receiving coil received through the power feeding magnetic field from the power receiving apparatus through the communication portion and calculating the coupling coefficient on the basis of the inductance and the receiving AC voltage value of the power receiving coil that are acquired, an inductance of the power feeding coil, and the feeding voltage value of the power source portion.

2. The contactless power feeding apparatus according to claim 1, wherein
the power feeding apparatus side control portion performs the feeding voltage control in order to control the feeding voltage value of the power source portion on the basis of the coupling coefficient that power transmission efficiency to a power receiving apparatus including the power receiving coil is in the vicinity of a maximum.

3. The contactless power feeding apparatus according to claim 1, wherein
the power feeding apparatus side control portion acquires a receiving DC voltage value that is a value of a DC voltage obtained by rectifying the AC voltage of the power receiving coil and a load power value of the power receiving apparatus through the communication portion, and
the power feeding apparatus side control portion sets a target receiving voltage value of the receiving DC voltage value in a case where the power transmission efficiency is in the vicinity of the maximum on the basis of the load power value of the power receiving apparatus that is acquired, the coupling coefficient, and the receiving AC voltage value and performs the feeding voltage control wherein the receiving DC voltage value that is acquired becomes the target receiving voltage value that is set.

4. The contactless power feeding apparatus according to claim 3, wherein
the power feeding apparatus side control portion performs control of calculating load resistance in the case where the power transmission efficiency is in the vicinity of the maximum on the basis of the coupling coefficient, a resistance value of the power receiving coil, a quality factor of the power receiving coil, and a quality factor of the power feeding coil and setting the target receiving voltage value corresponding to the load resistance.

5. The contactless power feeding apparatus according to claim 4, wherein
the power feeding apparatus side control portion performs control of setting the target receiving voltage value corresponding to the load resistance, using a value of a square root of a value obtained by multiplying the load power value of the power receiving apparatus by the load resistance.

6. The contactless power feeding apparatus according to claim 1, wherein
the power feeding apparatus side control portion performs control of acquiring the receiving AC voltage value at a prescribed time interval.

7. The contactless power feeding apparatus according to claim 1, wherein
the power feeding apparatus side control portion performs control of calculating the coupling coefficient represented by k with a following formula (1), $k=(V2/V1) \cdot \sqrt{L1/L2}$ . . . (1), setting an inductance of the power feeding coil to L1, an inductance of the power receiving coil to L2, the feeding voltage value of the power source portion to V1, and a receiving AC voltage value that is a value of an AC voltage of the power receiving coil to V2.

8. The contactless power feeding apparatus according to claim 7, wherein
the formula (1) is derived from a following formula (2), $M=k \cdot \sqrt{L1 \times L2}$ . . . (2), used to calculate a mutual inductance M between the power feeding coil and the power receiving coil and a following formula (3), $$V2 = \frac{M}{L1} V1, \qquad (3)$$

used to calculate the receiving AC voltage value represented by V2.

9. The contactless power feeding apparatus according to claim 1, wherein
the power feeding apparatus side control portion is configured not to feed electric power when the coupling coefficient is smaller than a prescribed value.

10. The contactless power feeding apparatus according to claim 1, wherein
the power feeding apparatus side control portion performs control of acquiring model information about the power receiving apparatus through the communication portion and determining whether or not to start the feeding voltage control on the basis of the model information that is acquired.

11. The contactless power feeding apparatus according to claim 1, wherein
the power source portion includes a resonance capacitor, a voltage variable AC-DC converter, and a switching circuit generating the AC by turning on/off a DC voltage from the voltage variable AC-DC converter at a resonance frequency of the power feeding coil and the resonance capacitor.

12. The contactless power feeding apparatus according to claim 11, wherein the resonance capacitor is connected in series to the power feeding coil.

13. The contactless power feeding apparatus according to claim 11, wherein
the switching circuit comprises a half-bridge switching circuit including a gate drive circuit and two field effect transistors.

14. The contactless power feeding apparatus according to claim 11, wherein
the switching circuit comprises a full-bridge switching circuit including a gate drive circuit and four field effect transistors.

15. The contactless power feeding apparatus according to claim 1, wherein
the power source portion includes a sine-wave generator and a variable amplifier.

16. A contactless power feeding apparatus comprising:
a power source portion capable of changing a feeding voltage value;
a power feeding coil generating a power feeding magnetic field by supply of an AC thereto from the power source portion; and
a power feeding apparatus side control portion controlling the feeding voltage value of the power source portion, wherein
the power feeding apparatus side control portion performs feeding voltage control in order to control the feeding voltage value of the power source portion on the basis of a coupling coefficient between the power feeding coil and a power receiving coil provided outside, receiving electric power through the power feeding magnetic field of the power feeding coil wherein power transmission efficiency to a power receiving apparatus including the power receiving coil is in the vicinity of a maximum,
further comprising a communication portion communicating with the power receiving apparatus, wherein
the power feeding apparatus side control portion performs control of acquiring an inductance of the power receiving coil and a receiving AC voltage value that is a value of an AC voltage of the power receiving coil received through the power feeding magnetic field from the power receiving apparatus through the communication portion and calculating the coupling coefficient on the basis of the inductance and the receiving AC voltage value of the power receiving coil that are acquired, an inductance of the power feeding coil, and the feeding voltage value of the power source portion.

17. The contactless power feeding apparatus according to claim 16, wherein
the power feeding apparatus side control portion acquires a receiving DC voltage value that is a value of a DC voltage obtained by rectifying the AC voltage of the power receiving coil and a load power value of the power receiving apparatus through the communication portion, and
the power feeding apparatus side control portion sets a target receiving voltage value of the receiving DC voltage value in a case where the power transmission efficiency is in the vicinity of the maximum on the basis of the load power value of the power receiving apparatus that is acquired, the coupling coefficient, and the receiving AC voltage value and performs the feeding voltage control wherein the receiving DC voltage value that is acquired becomes the target receiving voltage value that is set.

18. The contactless power feeding apparatus according to claim 17, wherein
the power feeding apparatus side control portion performs control of calculating load resistance in the case where the power transmission efficiency is in the vicinity of the maximum on the basis of the coupling coefficient, a resistance value of the power receiving coil, a quality factor of the power receiving coil, and a quality factor of the power feeding coil and setting the target receiving voltage value corresponding to the load resistance.

19. A contactless power feeding apparatus comprising:
a power source portion capable of changing a feeding voltage value;
a power feeding coil generating a power feeding magnetic field by supply of an AC thereto from the power source portion; and
a power feeding apparatus side control portion controlling the feeding voltage value of the power source portion, wherein
the power feeding apparatus side control portion performs feeding voltage control in order to control the feeding voltage value of the power source portion on the basis of a coupling coefficient between the power feeding coil and a power receiving coil provided outside, receiving electric power through the power feeding magnetic field of the power feeding coil wherein power transmission efficiency to a power receiving apparatus including the power receiving coil is in the vicinity of a maximum,
further comprising a communication portion communicating with the power receiving apparatus, wherein
the power feeding apparatus side control portion performs control of acquiring model information about the power receiving apparatus through the communication portion and determining whether or not to start the feeding voltage control on the basis of the model information that is acquired.

* * * * *